United States Patent
Mountcastle

(10) Patent No.: US 7,994,967 B2
(45) Date of Patent: *Aug. 9, 2011

(54) SYSTEMS AND METHODS FOR SPACE-TIME RADAR IMAGING

(75) Inventor: Paul D. Mountcastle, Huntington, CT (US)

(73) Assignee: Technology Service Corporation, Silver Spring, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/759,334

(22) Filed: Apr. 13, 2010

(65) Prior Publication Data

US 2010/0265124 A1    Oct. 21, 2010

Related U.S. Application Data

(63) Continuation of application No. 11/907,988, filed on Oct. 19, 2007, now Pat. No. 7,724,183.

(51) Int. Cl.
 *G01S 13/89* (2006.01)
(52) U.S. Cl. ...................................... 342/180; 342/25 F
(58) Field of Classification Search .................. 342/180
 See application file for complete search history.

(56) References Cited

U.S. PATENT DOCUMENTS

| | | | |
|---|---|---|---|
| 4,315,281 A * | 2/1982 | Fajans ............................ | 348/42 |
| 4,739,332 A | 4/1988 | Wiley | |
| 4,751,511 A | 6/1988 | Komata et al. | |
| 5,164,730 A | 11/1992 | Jain | |
| 5,250,952 A | 10/1993 | Roth | |
| 5,311,188 A | 5/1994 | Meijer et al. | |
| 5,329,286 A | 7/1994 | Lammers et al. | |
| 5,343,204 A | 8/1994 | Farmer et al. | |
| 5,583,972 A | 12/1996 | Miller | |
| 5,813,742 A | 9/1998 | Gold et al. | |
| 5,886,662 A | 3/1999 | Johnson | |
| 6,014,099 A | 1/2000 | Bennett et al. | |
| 6,023,235 A | 2/2000 | Sauer | |
| 6,035,057 A | 3/2000 | Hoffman | |
| 6,088,295 A | 7/2000 | Altes | |
| 6,130,641 A | 10/2000 | Kraeutner et al. | |
| 6,225,942 B1 | 5/2001 | Alon | |
| 6,259,396 B1 | 7/2001 | Pham et al. | |
| 6,278,799 B1 | 8/2001 | Hoffman | |

(Continued)

OTHER PUBLICATIONS

"Integrated Ballistic Missile Defense System". Slideshow Presentation. Feb. 21, 2007. 15 pages. <http://www.winmda.com/downloads/2007%20SBIR%20Industry%20Day/JulySBIRBarnes.pdf>.*

(Continued)

*Primary Examiner* — Thomas H Tarcza
*Assistant Examiner* — Matthew M Barker
(74) *Attorney, Agent, or Firm* — Finnegan, Henderson, Farabow, Garrett & Dunner, LLP

(57) ABSTRACT

A method of imaging a moving object, including the steps of acquiring radar data reflected by the moving object, determining a motion state of the moving object; and generating a three-dimensional representation of the moving object based on the determined motion state, is disclosed. The motion state may be a complete solution of translational and rotational motion determined based on at least one of the inertia tensor components of the moving object, or solutions of Euler's torque-free equations of motions. The three-dimensional representation may be generated by reconstructing static patterns of the moving object based on estimated initial translational and rotational conditions of the object. A system for imaging the moving object according to this method is also disclosed.

26 Claims, 7 Drawing Sheets

U.S. PATENT DOCUMENTS

| | | |
|---|---|---|
| 6,462,699 B2 | 10/2002 | Wurman et al. |
| 6,643,000 B2 | 11/2003 | Fluckiger |
| 6,721,056 B1 | 4/2004 | Nakauchi et al. |
| 6,897,802 B1 | 5/2005 | Daniell et al. |
| 6,943,724 B1 | 9/2005 | Brace et al. |
| 2004/0239549 A1 | 12/2004 | Morgan et al. |
| 2005/0280605 A1 | 12/2005 | Tsao |
| 2007/0018882 A1 | 1/2007 | Manoogian et al. |

OTHER PUBLICATIONS

T. Sparr, "ISAR—Radar Imaging of Targets With Complicated Motion," International Conference on Image Processing (ICIP), pp. 5-8 (2004).

Mark A. Stuff, "Three-Dimensional Analysis of Moving Target Radar Signals: Methods and Implications for ATR and Feature Aided Tracking," SPIE Conference on Algorithms for Synthetic Aperture Radar Imagery VI, SPIE vol. 3721, pp. 485-496 (Apr. 1999).

Atul Jain, "SAR/ISAR Imaging of a Nonuniformly Rotating Target," IEEE Transactions on Aerospace and Electronic Systems, vol. 28, No. 1, pp. 317-321 (Jan. 1992).

Chuangming Tong et al., "Simultaneous Extrapolation of RCS in Both Angular and Frequency Domains Based on AWE Technique," Microwave and Optical Technology Letters, vol. 32, No. 4, pp. 290-293 (Feb. 2002).

W.F Gabriel, "Superresolution Techniques and ISAR Imaging," IEEE, pp. 48-55 (1989).

Zheng-She Liu, "Complex ISAR Imaging of Maneuvering Targets via the Capon Estimator," IEEE Transactions on Signal Processing, vol. 47, No. 5, pp. 1262-1271 (May 1999).

Junfei Li et al., "An Algorithm to Detect the Presence of 3D Target Motion from ISAR Data," Multidimensional Systems and Signal Processing, vol. 14, pp. 223-240, Kluwer Academic Publishers (2003).

J.T. Mayhan, "High Resolution 3D "Snapshot" ISAR Imaging and Feature Extraction," IEEE Transactions on Aerospace and Electronic Systems, vol. 37, No. 2, pp. 630-641 (Apr. 2001).

R.A. Marr et al., "Coherent 3-D Imaging of Model Targets," pp. 289-294 (1997).

P.D. Mountcastle et al., "Technique for Frequency Analysis of Unevenly Sampled Radar Data," Proceedings of the IEEE Radar Conference, Long Beach, CA (Apr. 2002).

Evan J. Hughes, "Radar Cross Section Modelling Using Genetic Algorithms," Cranfield University, pp. Title-166 (May 1998).

Sparr, T. "ISAR—Radar Imaging of Targets With Complicated Motion", 2004 International Conference on Image Processing, vol. 1, Oct. 2004, pp. 5-8.

Thayaparan et al. "3D Motion Model and Detection Method for ISAR Imaging" International Radar Symposium, 2006. May 2006, pp. 1-4.

Wang et al. "Three-Dimensional ISAR Imaging of Maneuvering Targets Using Three Receivers", IEEE Transactions on Image Processing, vol. 10, Issue 3, Mar. 2001, pp. 436-447.

L.D. Landau and E.M. Lifshitz, *Course of Theoretical Mechanics*, vol. 1: *Mechanics*, Pergamon Press, 1960.

* cited by examiner

SYSTEMS AND METHODS FOR SPACE-TIME RADAR IMAGING

This application is a continuation of application Ser. No. 11/907,988, now U.S. Pat. No. 7,724,183, which was filed on Oct. 19, 2007, and is incorporated in its entirety herein by reference.

I. U.S. GOVERNMENT RIGHTS

This invention was made with Government support under Contract No. N00178-04-C-3088 awarded by the Naval Surface Warfare Center, Dahlgren Division. The Government may have certain rights in this invention.

II. TECHNICAL FIELD

The present disclosure is directed to systems and methods for space-time radar imaging and, more particularly, to a system and method for generating a radar image of an object traveling in torque-free motion, based on a complete motion solution of the object.

III. BACKGROUND

In the field of radar imaging, such as the radar imaging of objects moving through outer space, certain assumptions are often made regarding the motion state of the object. Specifically, the motion of the entire object is often modeled after the straight-line translation of a single point (usually the tip) of the object. More generally, the motion is modeled after the rotation of the object at a constant rate about an axis containing the radar line-of-sight, and for a time that is very short compared to the rotational period. These assumptions are intended to simplify estimation of the motion state of the object in order to ease, or even make possible, the calculations required in subsequent radar data image processing.

For example, in conventional Inverse Synthetic Aperture Radar ("ISAR") systems, pulsed, wideband radar bursts are directed at a moving object and reflected back by "scatterers," which may be moving in various directions and speeds relative to the center of mass ("CM") of the object. When using the traditional assumption that scatterers on the object move in linear trajectories and thus have a constant radar phase history, the reflected radar data can be simply modeled as a linear function of time and frequency. The object motion is therefore relatively primitive and only estimates the velocity vector of a single point on the object at a nearly instantaneous moment in time. This is usually referred to in the prior art as "3D snapshot" imaging.

Unfortunately, 3D snapshot imaging, and other known ISAR data processing systems and methods, result in less than optimal resolution images of the object of interest that may be too coarse for a given imaging application (e.g., approximately 15 cm resolution for a radar with 1 GHz of bandwidth). The radar imaging interval must be very short to avoid "smearing" of the image over time, which often results from these conventional motion assumptions. Moreover, known radar imaging methods do not provide users with sufficient information about the true object motion, and more specifically, the rotation, of the object, which may be especially desired in some cases.

For example, in certain circumstances, the precise, combined, orbital-translational motion state, rotational motion state, and image of a projectile or satellite in exoatmospheric trajectory may be desired. In this case, the projectile may be traveling in torque-free motion (i.e., without external forces other than gravity) in an elliptical orbit about the Earth. The precise geometrical motion state (e.g., the precession frequency, spin frequency, half-cone angle, and direction of angular momentum vector) of this trajectory may be valuable for the purposes of discriminating between various types of objects moving through space, such as between randomly-tumbling objects and spin-precessing vehicles.

The systems and methods of the present disclosure solve one or more of the problems set forth above.

IV. SUMMARY OF THE DISCLOSURE

One aspect of the present disclosure is directed to a system for imaging a moving object, the system including a receiver configured to acquire radar data reflected by the moving object; a memory configured to store instructions for processing the acquired radar data; a processor configured to determine a motion state of the moving object and generate a three-dimensional representation of the moving object; and a display unit configured to display the three-dimensional representation of the moving object based on the determined motion state.

Another aspect of the present disclosure is directed to a method of imaging a moving object, the method including the steps of acquiring radar data reflected by the moving object; defining an intensity of the radar data as a function of generalized coordinates of motion; defining estimated initial conditions for the generalized coordinates of motion; integrating the intensity of the defined radar data across the moving object; and redefining the estimated initial conditions until the integrated intensity of the radar data has been optimized.

Yet another aspect of the present disclosure is directed to a method of imaging a moving object, the method including acquiring radar data reflected by the moving object; determining a motion state of the moving object; and generating a three-dimensional representation of the moving object based on the determined motion state.

Yet another aspect of the present disclosure is directed to a computer-readable medium that stores a set of executable instructions, which when read by a processor perform steps in a method of imaging a moving object, the steps including acquiring radar data reflected by the moving object; determining a motion state of the moving object; and generating a three-dimensional representation of the moving object based on the determined motion state.

In this respect, before explaining at least one embodiment of the invention in detail, it is to be understood that the invention is not limited in its application to the details of construction and to the arrangements of the components set forth in the following description or illustrated in the drawing. The invention is capable of embodiments in addition to those described and of being practiced and carried out in various ways. Also, it is to be understood that the phraseology and terminology employed herein, as well as the abstract, are for the purpose of description and should not be regarded as limiting.

The accompanying drawings, which are incorporated in and constitute a part of this specification, illustrate certain embodiments of the invention, and together with the description, serve to explain the principles of the invention.

As such, those skilled in the art will appreciate that the conception upon which this disclosure is based may readily be utilized as a basis for designing other structures, methods, and systems for carrying out the several purposes of the present invention. It is important, therefore, to recognize that the claims should be regarded as including such equivalent

V. BRIEF DESCRIPTION OF THE DRAWINGS

VI. DETAILED DESCRIPTION

Figure 1:
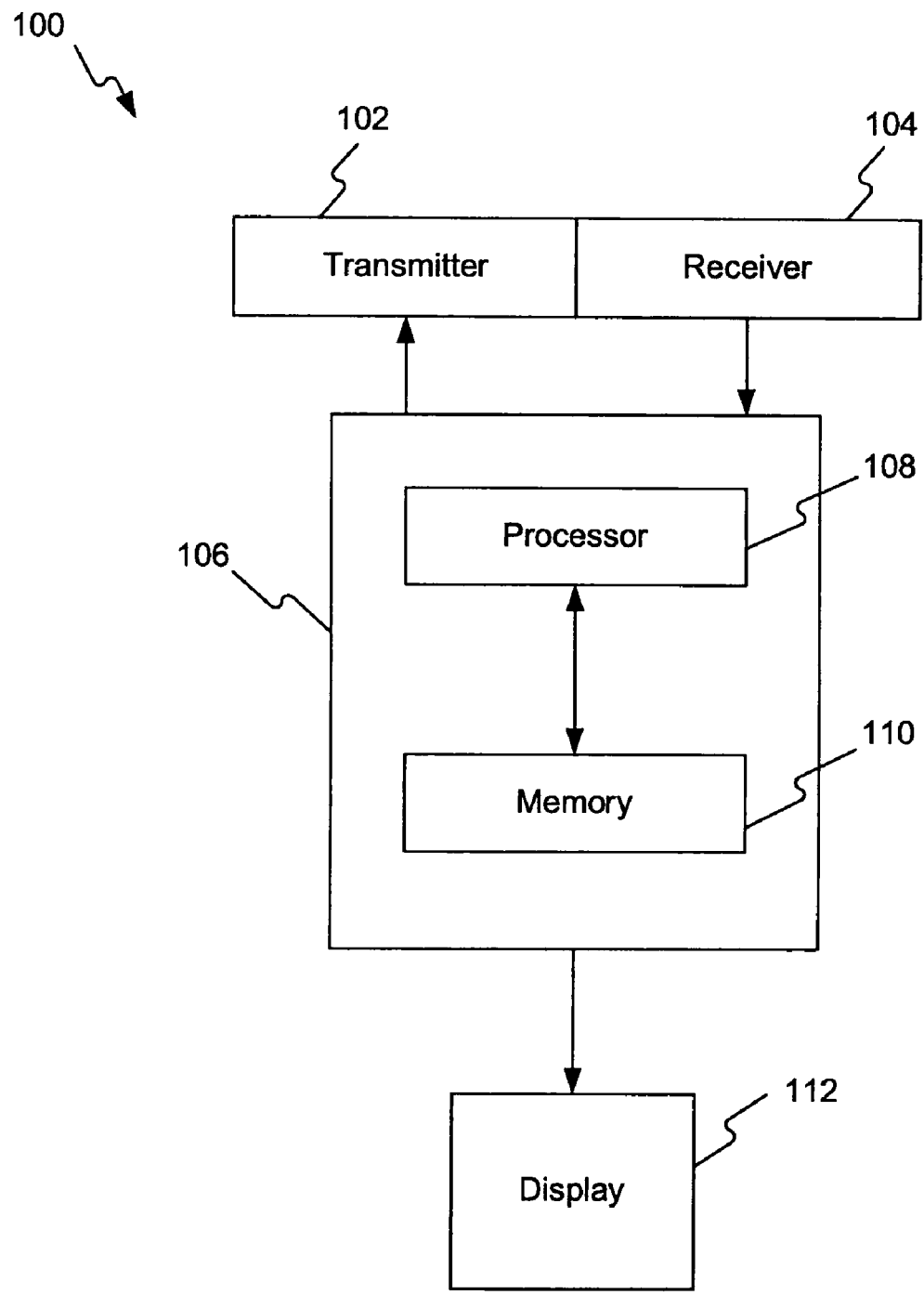
FIG. 1 is a diagram illustrating an exemplary embodiment of a space-time imaging system consistent with the present disclosure.

FIG. 1 illustrates an exemplary embodiment of a space-time imaging system 100 consistent with the present disclosure. In general, space-time imaging system 100 may be configured to acquire radar data reflected by a moving object, determine a motion state of the moving object, and generate a three-dimensional representation of the moving object based on the determined motion state.

Space-time imaging system 100 may include a transmitter 102, a receiver 104, a radar processing computer 106, and a display unit 112. Transmitter 102 may be configured to direct pulsed, wideband, radar waves toward a moving object. For example, transmitter 102 may direct pulsed S-band, X-band, L-band, and/or UHF radar waves toward the moving object. In some embodiments, multiple sets of transmitters 102 and receivers 104, of possibly diverse frequencies, may be disposed at remote locations in order to view the moving object from diverse aspect angles.

The moving object may be any object moving in substantially torque-free motion through outer space such that gravity is the only external force acting on the object. For the purposes of this disclosure, it will be understood that the moving object may be traveling in an exoatmospheric, orbital trajectory around Earth, such that its motion can be modeled as being governed by Newton's laws and Kepler's laws. It will further be understood by one of skill in the art that the orientation of any such object may be fully defined by two sets of information: the location of its center of mass relative to an Earth-centered inertial ("ECI") frame and the rotational orientation of the object about its center of mass. Such a distinction may be useful in defining radar data as a function of the translational and rotational motion state of the object.

Receiver 104 may be configured to acquire this information about the orientation and motion of such a moving object from radar data reflected by the object. Specifically, receiver 104 may receive radar data that has been directed towards the object by transmitter 102 and then reflected away from the object by scatterers on the object. Receiver 104 may also be configured to communicate the acquired radar data to radar processing computer 106. Radar processing computer 106 may include at least a processor 108 and a memory 110.

Memory 110 may be configured to store instructions for processing the acquired radar data. That is, memory 110 may store program code executable by processor 108. Memory 110 may also provide such instructions to processor 108. Memory 110 may be any type of data storage device including: magnetic storage, such as a floppy disk, hard disk, or magnetic tape; semiconductor storage such as solid state disk (SSD) or flash memory; optical disc storage such as CD-ROM, CD-RW, DVD, DVD-RW, Blu-ray, or HD DVD; magneto-optical disc storage; phase-change memory; or holographic storage.

Processor 108 may process data according to instructions stored in memory 110. Specifically, processor 108 may be configured to determine a motion state of the moving object and generate a three-dimensional representation of the moving object. Processor 108 may determine the motion state of the moving object by solving for complete solutions of the translational and rotational motion states of the moving object. For this purpose, processor 108 may define an intensity of the radar data as a function of generalized coordinates of motion; define estimated initial conditions for the generalized coordinates of motion; integrate the intensity of the defined radar data across the moving object; and redefine the estimated initial conditions until the integrated intensity of the radar data has been optimized. Processor 108 may also be configured to generate a three-dimensional representation of the moving object by reconstructing static patterns of the moving object as a function of the estimated initial conditions that optimize the integrated intensity of the radar data. In other words, processor 108 may be configured to generate the three-dimensional representation by associating radar pulse times with estimates for the orientation of the moving object. Further details regarding the specific processing steps performed by processor 108 will be described below with respect to FIGS. 3-6. In addition to performing logic, mathematical and other operations on the data, processor 108 may communicate or transfer data to and from transmitter 102 and receiver 104.

The functions of processor 108 may be provided by a single dedicated processor or by a plurality of processors. Moreover, the processor may include, without limitation, any appropriate type of general purpose microprocessor, digital signal processor (DSP) hardware, microcontroller, or any other hardware capable of executing software. Processor 108 may execute sequences of computer program instructions to perform various processes as explained above. Processor 108 may be coupled to or access other devices of space-time imaging system 100, to complete executions of computer program instructions stored on memory 110.

Radar processing computer 106 may also include a graphic user interface (GUI) to display information to users of space-time imaging system 100. Thus, radar processing computer 106 may communicate with any suitable type of computer monitor or display unit 112. Display unit 112 may be configured to simultaneously display the three-dimensional representation and the determined motion state generated by processor 108. Of course, various input devices (not pictured) may also be provided for users to input information into radar processing computer 106. Input devices may include a keyboard, a mouse, or other optical or wireless computer input device, etc. Furthermore, a network interface may provide communication connections such that radar processing computer 106 may be accessed remotely, for example by cooperating radar processing computers, through computer networks via various communication protocols, such as transmission control protocol/internet protocol (TCP/IP) or hyper text transfer protocol (HTTP).

In one embodiment, space-time imaging system 100 may be applicable to any existing radar transmitting and receiving system including, for example, a multi-function S-band phased-array radar, such as the AN/SPY-1; an X-band radar, such as the Sea-Based X-band radar (SBX); a combination of S-band phased-array radar and X-band dish radar, such as the AN/SPQ-11 Cobra Judy; or a transportable dual-frequency Cobra Gemini radar system.

Figure 2:
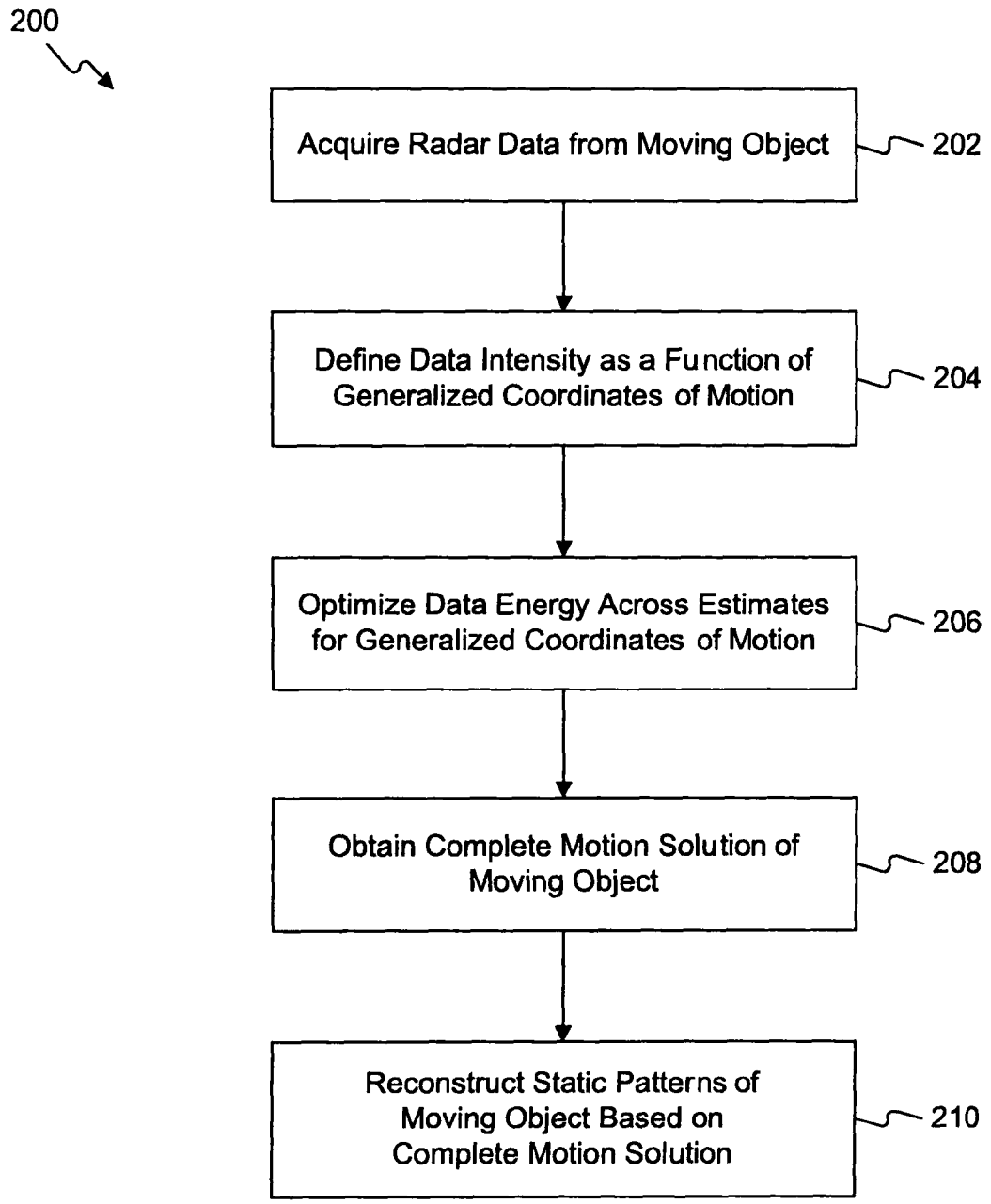
FIG. 2 is a flowchart illustrating an exemplary embodiment of a space-time imaging method consistent with the present disclosure.

FIG. 2 illustrates an exemplary embodiment of a space-time imaging method 200 consistent with the present disclosure, which may be carried out by processor 108 of space-time imaging system 100. In general, space-time imaging method 200 may include the steps of: acquiring radar data from an object moving in torque-free motion through outer space (step 202); defining the intensity of the radar data as a function of generalized coordinates of motion (step 204); optimizing the energy of the radar data across estimates for the generalized coordinates of motion (step 206) to obtain a complete motion solution for the moving object (step 208); and reconstructing static patterns of the moving object based on the complete motion solution (step 210).

Figure 3:
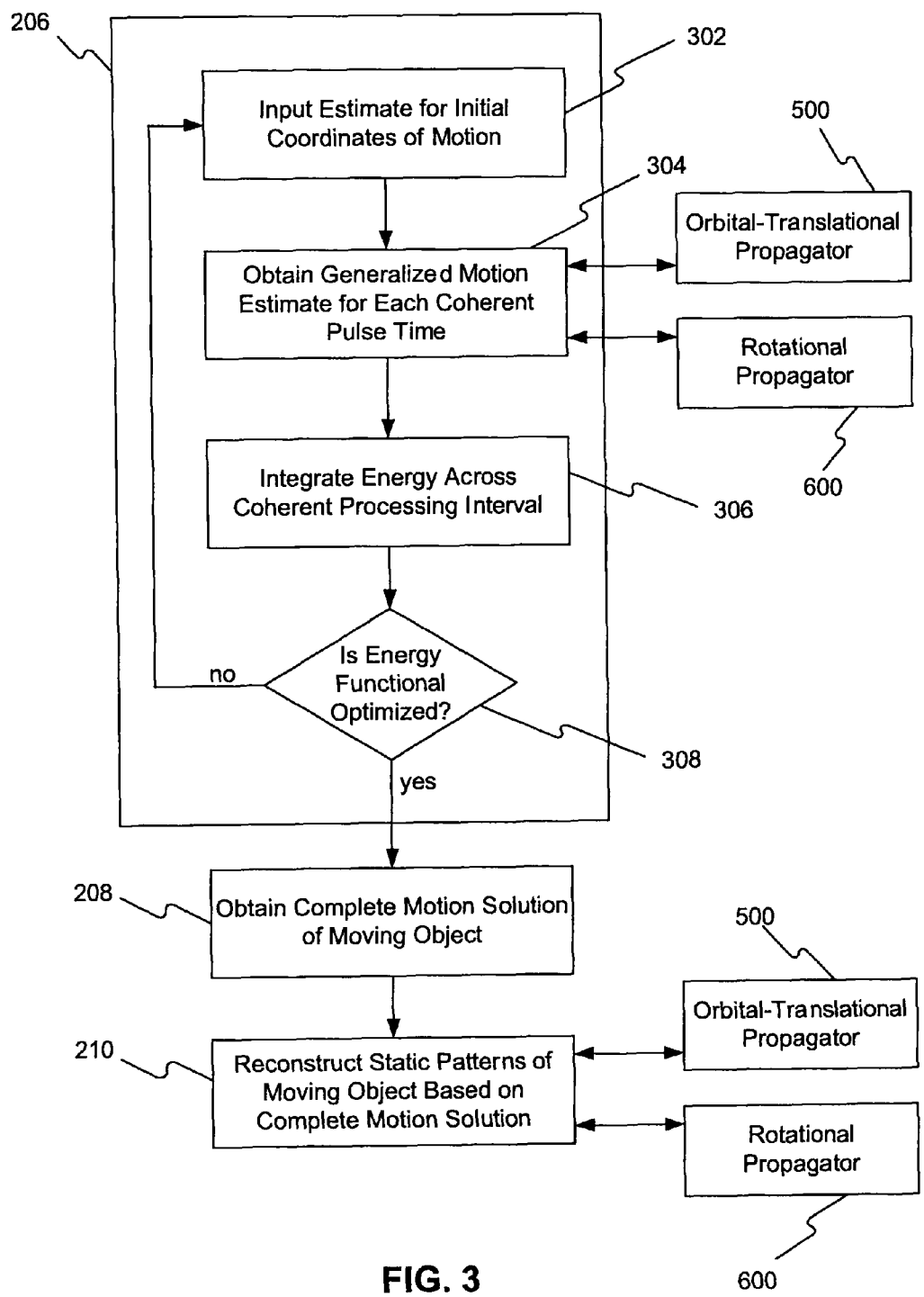
FIG. 3 is a flowchart illustrating certain steps in the space-time imaging method illustrated in FIG. 2.
Figure 4:
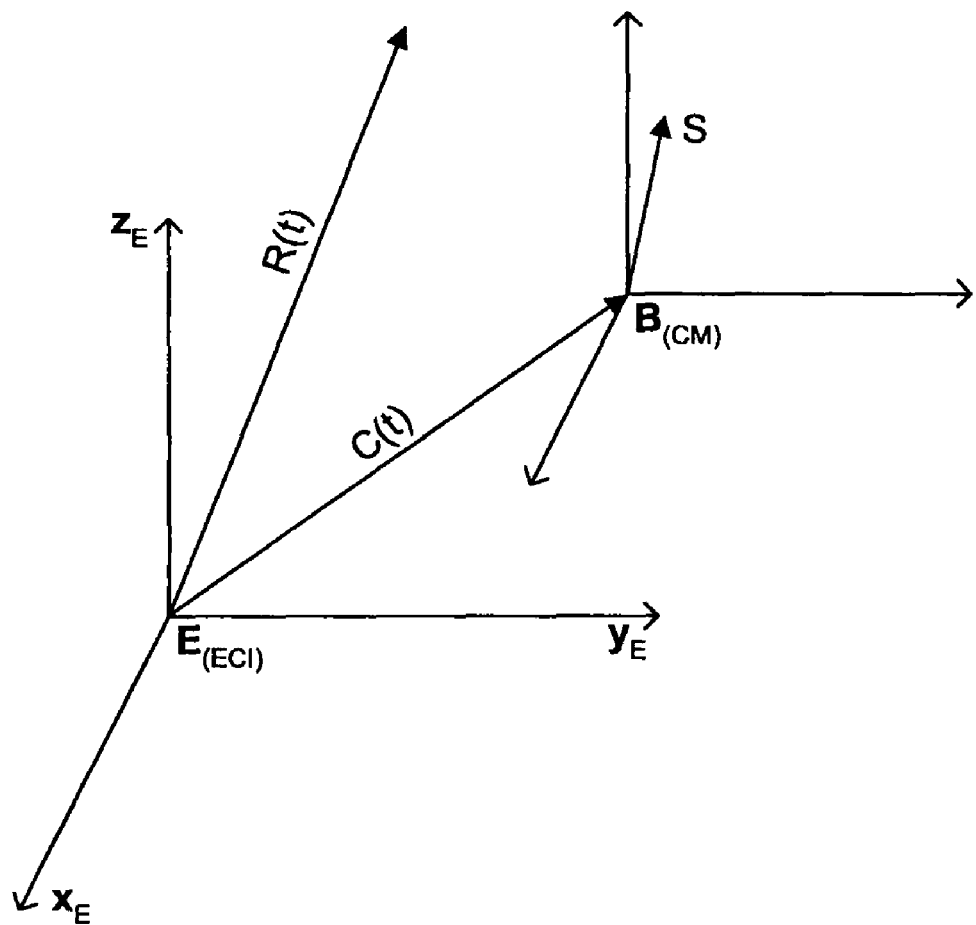
FIG. 4 is a graphical representation of an exemplary configuration between an earth-centered inertial frame and a body-fixed coordinate frame of a moving object.

These exemplary steps of space-time imaging method 200 will be better understood with reference to FIGS. 3 and 4. FIG. 4 represents an exemplary configuration between an Earth-centered inertial ("ECI") frame E and a body-fixed coordinate frame B of a moving object. This framework may be useful in describing the motion states of individual scatterers on the object relative to an inertial reference, the values of which may be used in steps of space-time imaging method 200.

For example, ECI frame E may be defined by three orthonormal vectors having their origins at the center of the Earth. In one embodiment, a first vector $z_E$ may point toward the North pole, a second vector $x_E$ may pass through the equator at the Greenwich meridian at 00:00 UT, and the third vector $y_E$ may be defined by $y_E = z_E \times x_E$. Body-fixed coordinate frame B may have its origin fixed at the center of mass ("CM") of the moving object, which may be assumed to be rigid, such that all scatterers are stationary with respect to body-fixed coordinate frame B. Body-fixed coordinate frame B may include three orthonormal body axes that define the principal axis frame of the body mass distribution of the object relative to the ECI frame E.

As discussed above, the orientation and motion of body-fixed coordinate frame B may be defined by separable components of both orbital-translation and rotation relative to ECI frame E.

In terms of the orbital-translational component, the position of the CM of the moving object, and therefore the origin of frame B, is represented in FIG. 4 by C(t). In practice, the value of C(t) relative to the inertial coordinates may be provided in terms of time dependent position and velocity states (i.e., $C(x_0, v_0|t)$) by radar tracker and fine motion compensation. Alternatively, C(t) may be defined in terms of generalized coordinates of motion (i.e., $C(\theta|t)$, where $\theta$ denotes the initial conditions $(x_0, v_0)$, or a complete set of functions of those coordinates) defined by the following representation of Newton's law, where g(C,t) describes the acceleration of the object due to gravity as a function of space and time:

$$\frac{d^2 C}{dt^2} - g(C, t) = 0$$

In terms of the rotational component of the object, the time dependent orientation of body-fixed coordinate frame B relative to ECI frame E may be represented by a 3×3 orthogonal rotation matrix [E B]. As with the orbital translation, the rotational matrix-valued function [E B] may be defined in terms of generalized coordinates of motion. Specifically, [E B] may depend parametrically in the most general case on two inertia ratios of the rotating object, three initial Euler angles $(\theta_0, \phi_0, \psi_0)$, and three initial Euler rates $(\dot{\theta}_0, \dot{\phi}_0, \dot{\psi}_0)$ of the moving object to give the following equation:

$$[EB] = [EB](I, \theta_0, \phi_0, \psi_0, \dot{\theta}_0, \dot{\phi}_0, \dot{\psi}_0 | t) \equiv [EB](\overline{q}|t)$$

where [E B]($\overline{q}|t$) describes the coordinates of motion in their most general form. The above representation of rotational trajectory may also be expressed as: [E B]($\overline{p}|t$) where p is a transformed set of parameters that may be propagated across various generalized spaces of coordinates. By defining both the orbital-translational and rotational states of the moving object as functions of generalized coordinates of motion, a set of radar pulses from a single transmitter 102 may be used to simultaneously perform imaging, translational tracking, and rotational tracking of the moving object.

As illustrated in FIG. 4, one exemplary scatterer of the moving object may be located in frame B at vector position s. Moreover, the position of the phase center of radar emitted from transmitter 102 is represented in FIG. 4 by R(t). Given this configuration, and the generalized formulations of translational C(t) and rotational [E B]($\overline{p}|t$) motion defined above, the distance (d) from the radar phase center to each scatterer (s) may be represented by the equation:

$$d(s, t|\overline{p}) = |C(t) + [E B](\overline{p}|t) \cdot s - R(t)|$$

Thus space-time imaging method 200 may acquire radar data reflected by the moving object that incorporates the generalized equations of motion set forth above (step 202). Given this generalized representation of phase center-to-scatterer distance, the round-trip phase difference for each scatterer may be given by:

$$\Phi(s, f, \tau | \overline{p}) = \frac{4\pi f}{c} |C(t) + [EB](\overline{p} | t) \cdot s - R(t)|$$

for true values of the generalized rotational coordinates p, and a monochromatic signal of frequency f emitted at pulse time $\tau$.

Given a sequence of wideband radar pulses containing frequencies $\{f_j, j=1 \ldots N_f\}$ reflected from the moving object at a series of pulse times $\{t_i, i=1 \ldots N_t\}$, the amplitudes and phase differences for each frequency and pulse may be arranged in the form of a complex matrix Z. Complex matrix Z may be described as the measured complex transfer function of the target over the bandwidth and the coherent processing interval ("CPI") of the acquired radar data (i.e., the measured wideband I and Q data for all pulses in the CPI).

Thus, space-time imaging method 200 may include the step of defining the intensity of the acquired radar data as a function of the above-described generalized coordinates of motion (step 204), as given by the following equation:

$$I(s \mid \overline{p}) = \left| \sum_{i=1}^{N_t} \sum_{j=1}^{N_f} W_T(i) W_f(j) Z(i, j) \exp[-i\Phi(s, f_j, \tau_i \mid \overline{p})] \right|^2$$

where $W_T(i)$ and $W_f(j)$ are amplitude taper functions, such as Hamming or Kaiser-Bessel windows, that may be used for image sidelobe suppression. As with the representation of phase difference recited above, the above definition for intensity may be conditioned on a hypothesis that the generalized coordinates of motion describe the actual orbital-translational and rotational motion states of the object.

Space-time imaging method 200 may also include the step of optimizing the data energy across estimates for the generalized coordinates of motion (step 206). FIG. 3 illustrates an exemplary method for carrying out the step of optimizing an energy functional of the radar data. In one embodiment, the method may include inputting estimates for the initial generalized coordinates of motion of the object of interest (step 302). The initial generalized coordinates of motion may include one or more of the object's inertia tensor components; Euler angles; Euler rates; spin precession rates; cone angle; and a reference time, and may be estimated based on known variables.

A generalized motion estimate may then be generated for each coherent pulse time of the coherent processing interval (step 304). In one embodiment, each generalized motion estimate may be generated by reconstructing static patterns of the moving object based on the estimated initial generalized coordinates of motion through the use of space-time propagators. Specifically, as depicted in FIG. 3, an orbital-translational propagator 500 and a rotational propagator 600 may be used to reconstruct static patterns of the moving object at earlier and later pulse times of the CPI based on the estimated initial conditions. In other words, the propagators may generate a set of reconstructed static patterns that all correspond to the current estimate of initial conditions, with each static pattern being associated with a particular pulse time τ. Given these reconstructed static patterns, the intensity of the acquired radar data may be integrated across the reconstructed three-dimensional Fourier images of the moving object (step 306) as expressed by the following equation:

$$\epsilon(\overline{p}) = \int I(s,\overline{p}) ds$$

Those generalized coordinates of motion p that optimize the energy functional expressed above (step 308), may result in the complete solution for the translational and rotational motion of the moving object (step 208). For example, in one embodiment, the values of generalized coordinates of motion p that maximize the energy functional above, may be assumed to be those which best define the true motion state of the object (step 308). Alternatively, the values of generalized coordinates of motion p that minimize the energy functional above, may be assumed to be those which best define the true motion state of the object (step 308).

Once space-time imaging method 200 has obtained the complete motion solution of the moving object (step 208), one or more radars having a view of the moving object during the exoatmospheric stage of its flight may reconstruct the static patterns by associating pulse times with target aspects propagated based on the correct estimate of the motion solution by the orbital-translational propagator 500 and the rotational propagator 600 (step 210).

Systems and methods for space-time radar imaging consistent with the present disclosure may employ any type of propagator suitable for analytically and/or numerically advancing the moving object through space and time. For example, a differential propagator may be employed in which the law of gravity is expressed as a numerical differential equation of the second order. In this embodiment, sufficiently short time steps may generate the position of a moving object at any later time, given the position at an earlier time.

Suitable propagators may also include orbital-translational and rotational propagators, of the type described below, for advancing the object through space and time.

Figure 5A:
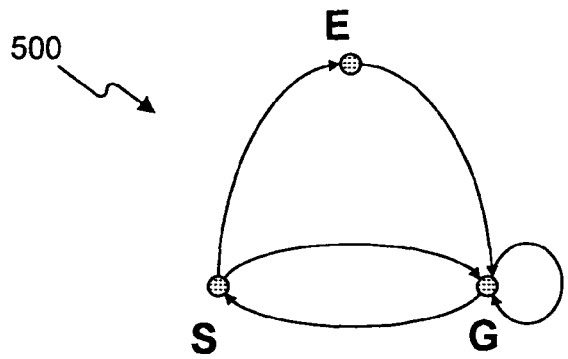
FIG. 5A is a graphical representation of steps in an exemplary embodiment of an orbital-translational propagator consistent with the present disclosure.
Figure 5B:
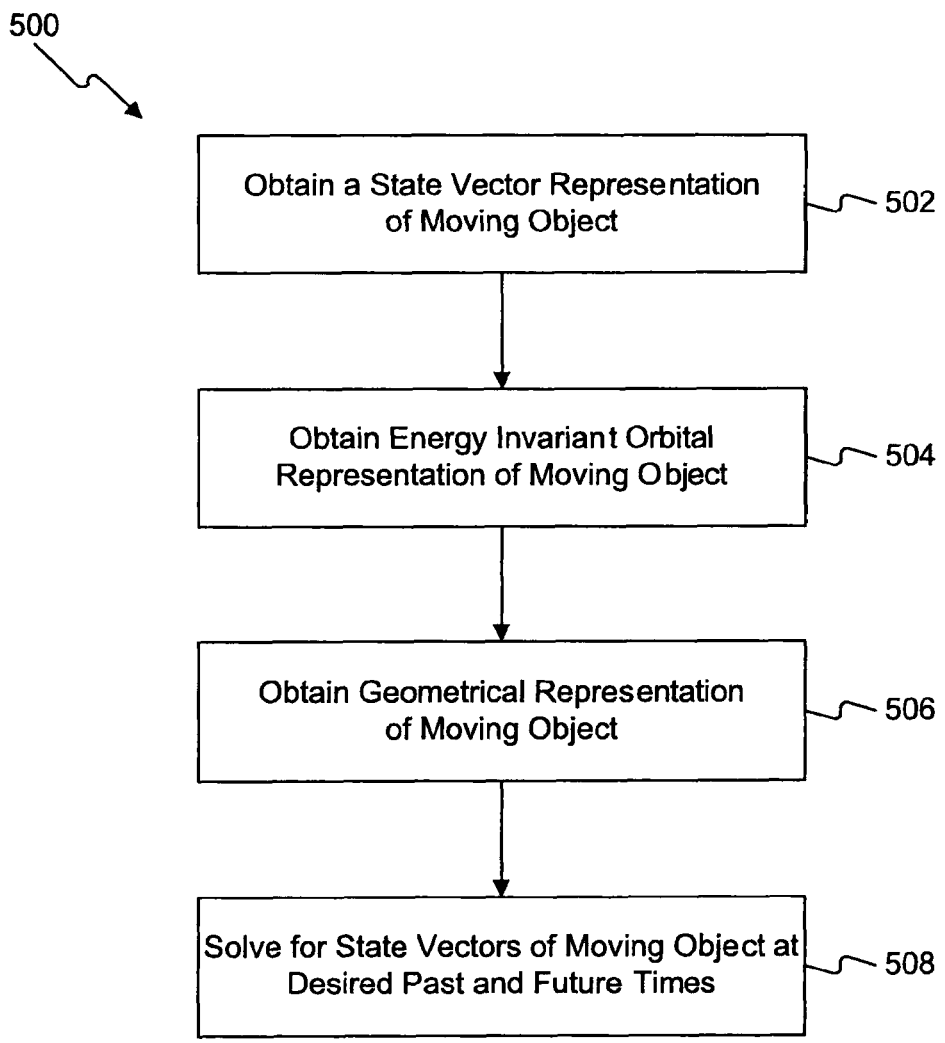
FIG. 5B is a flowchart illustrating steps in the orbital-translational propagator of FIG. 5A.

FIGS. 5A and 5B illustrate steps in an exemplary orbital-translational propagator 500. FIG. 5A illustrates an embodiment of the process for propagating forward or backward through time. Specifically, FIG. 5A illustrates paths between a state vector representation S, an energy invariant representation E, and a geometrical representation G, in which the loop about G represents one method for advancing through time. As will be discussed with respect to FIG. 5B, the intermediate energy invariant representation E may be used to determine the Keplarian orbit (defined by G) given an arbitrary starting state vector S.

Referring to FIG. 5B, orbital-translational propagator 500 may be configured to advance the center of mass of an object through space and time relative to the ECI frame, having obtained an initial state vector representation S of the moving object (i.e., position r and velocity v for a given reference time) (step 502). The orbital-translational orientation may then be represented by obtaining an energy invariant orbital representation E of the moving object (step 504). Energy invariant representation E may be based on conservation of orbital energy E, conservation of orbital angular momentum vector J, and an inertially invariant Runge-Lenz vector A. These parameters of energy invariant representation E, may be found starting from an arbitrary state vector S in the ECI frame, according to the relationships defined in the table below:

| Symbol | Meaning | Expression |
| --- | --- | --- |
| E | Specific Energy | $E = \frac{1}{2} v \cdot v - \frac{GM_E}{\sqrt{r \cdot r}}$ |
| J | Specific Angular Momentum | $J = r \times v$ |
| A | Runge-Lenz Vector | $A = v \times r \times v - \frac{GM_E r}{\sqrt{r \cdot r}}$ |

The geometrical representation G of the elliptical orbit of the moving object may then be obtained from energy invariant representation E according to relationships defined in the table below (step 506):

| Symbol | Meaning | Expression |
| --- | --- | --- |
| a | Semi-major axis | $a = -\frac{GM_E}{2E}$ |
| e | Orbital Eccentricity | $e = \sqrt{1 + \frac{2EJ \cdot J}{(GM_E)^2}}$ |
| b | Semi-minor axis | $b = a\sqrt{1-e^2}$ |
| $z_O$ | Orbit-fixed z-axis | $z_O = \frac{J}{\sqrt{J \cdot J}}$ |

-continued

| Symbol | Meaning | Expression |
|---|---|---|
| $x_O$ | Orbit-fixed x-axis | $x_O = \dfrac{A}{\sqrt{A \cdot A}}$ |
| $y_O$ | Orbit-fixed y-axis | $y_O = z_O \times x_O$ |
| [O ECI] | ECI-to-Orbit Transformation | $[O\,ECI] = \begin{bmatrix} x_O \cdot x_E & y_O \cdot x_E & z_O \cdot x_E \\ x_O \cdot y_E & y_O \cdot y_E & z_O \cdot y_E \\ x_O \cdot z_E & y_O \cdot z_E & z_O \cdot z_E \end{bmatrix}$ |
| [ECI O] | Orbit-to-ECI Transformation | $[ECI\,O] = [O\,ECI]^T$ |

As will be understood by one of skill in the art, the geometrical, elliptical orbit of the moving object may be defined according to the locus of points (r, θ) satisfying the following equation:

$$\frac{1}{r} = \frac{1}{a(1-e^2)}[1 + e\cos(\theta)]$$

The polar angle θ may be defined by the following equation:

$$t = \frac{J^3}{(GM_E)^2} \int_0^\theta \frac{d\theta}{[1 + e\cos(\theta)]^2}$$

The value of the apsidal time ($t_A$) needed to fully define the geometrical representation G may be calculated by converting the state vector representation S into its polar form in an orbit-fixed frame (O) and solving Kepler's equations according to the steps listed in the table below:

| | |
|---|---|
| Convert $r(t_{SV})$ from ECI to Orbit fixed frame (O). | $\begin{bmatrix} x \\ y \\ 0 \end{bmatrix} = [O\,ECI] \begin{bmatrix} r \cdot x_E \\ r \cdot y_E \\ r \cdot z_E \end{bmatrix}$ |
| Calculate its polar angle in the x-y plane | $\theta = \tan^{-1}(y/x)$ |
| Compute ψ corresponding to time $t_{SV}$ | $\psi = 2\tan^{-1}\left(\sqrt{\dfrac{1-e}{1+e}} \tan\dfrac{\theta}{2}\right)$ |
| Calculate apsidal time $t_A$ | $t_A = t_{SV} - \sqrt{\dfrac{a^3}{GM_E}}(\psi - e\sin\psi)$ |

Given the polar angle θ as a function of any time t and the radius r as a function of any time t, as provided above, a new state vector representation S of the moving object at any desired past or future time t may be solved for (numerically) by rotating the new vectors in the orbit-fixed frame (O) back into the ECI frame according to the table below (step 508):

| | |
|---|---|
| (1) Solve Kepler's Equation (numerically) | $\psi : \psi - e\sin\psi - \sqrt{\dfrac{GM_E}{a^3}}(t - t_A) = 0$ |
| (2) Calculate new polar angle. (analytically) | $\theta(t) = 2\tan^{-1}\left(\sqrt{\dfrac{1+e}{1-e}} \tan\dfrac{\psi}{2}\right)$ |
| (3) Calculate new polar radius. (analytically) | $r(t) = \dfrac{a(1-e^2)}{[1 + e\cos(\theta)]}$ |
| (4) Propagate position vector to new time t (in ECI coordinates) (analytically) | $r(t) = [ECI\,O] \begin{bmatrix} r\cos\theta \\ r\sin\theta \\ 0 \end{bmatrix}$ |
| (5) Angular velocity (from angular momentum) (analytically) | $\dot\theta = \dfrac{J}{r^2}$ |
| (6) Radial velocity (from Energy). (analytically) | $\dot r = \sqrt{2\left(E + \dfrac{GM_E}{r} - \dfrac{J^2}{2r^2}\right)}$ |
| (7) Propagate velocity to new time t (in ECI coordinates) (analytically) | $v(t) = [ECI\,O] \begin{bmatrix} \dot r\cos\theta - r\dot\theta\sin\theta \\ \dot r\sin\theta + r\dot\theta\cos\theta \\ 0 \end{bmatrix}$ |

Thus, orbital-translational propagator 500 illustrated in FIGS. 5A-5B may propagate the motion state of the CM of the moving object at a given time to any desired past or future time. For example, orbital-translational propagator 500 may be configured to determine the position and velocity of the CM of the moving object at any pulse time τ for a given set of estimated initial generalized coordinates of orbital-translational motion (e.g., C(θ|t).

Figure 6:
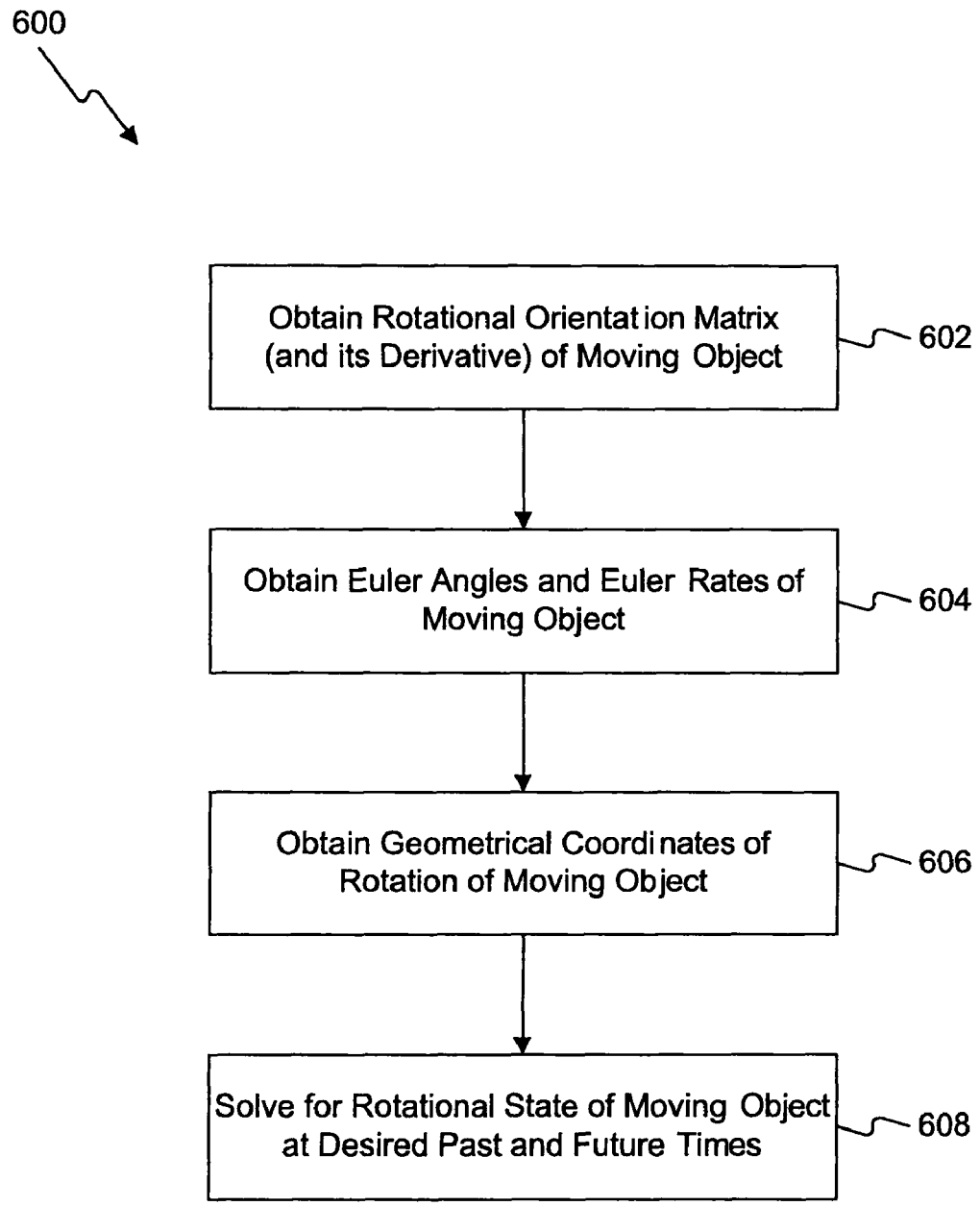
FIG. 6 is a flowchart illustrating steps in an exemplary embodiment of a rotational propagator consistent with the present disclosure.
Figure 7:
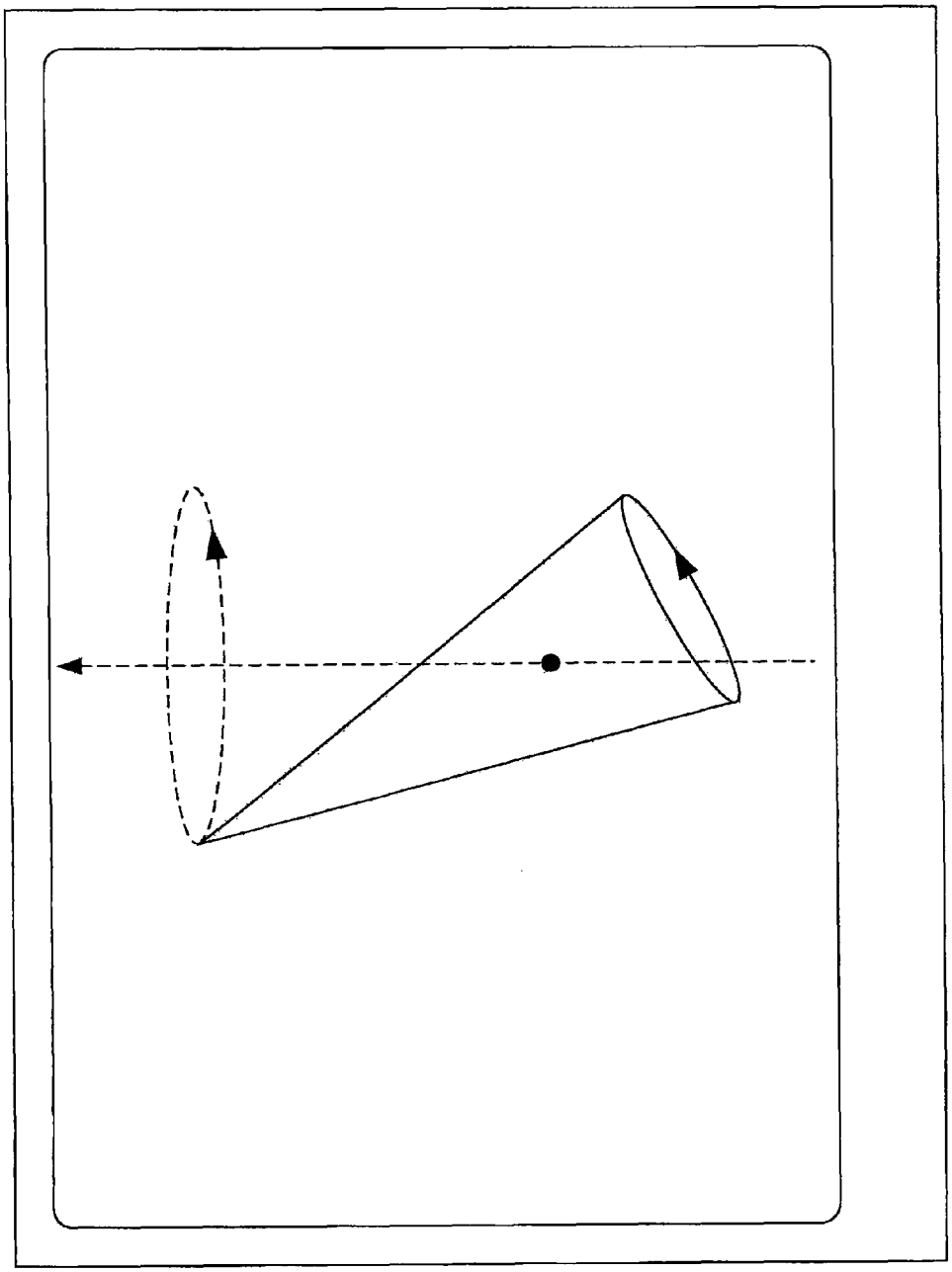
FIG. 7 depicts a display unit configured to display the three-dimensional representation of the moving object based on the determined motion state.

Referring now to FIG. 6, space-time imaging method 200 may further include rotational propagator 600. In analogy with orbital-translational propagator 500, rotational propagator 600 may perform steps in moving between three different representations of generalized coordinates of rotational motion. Given a principal axis body-fixed frame P, the rotational inertia tensor I of the object about its center of mass may be diagonalized into principal axis form according to the equation:

$$I = \int_V |r\rangle dm \langle r| = [EP]\begin{bmatrix} I_1 & 0 & 0 \\ 0 & I_2 & 0 \\ 0 & 0 & I_3 \end{bmatrix}[PE]$$

where $\langle r| = [x\ y\ z]$ and $|r\rangle = [x\ y\ z]^T$ are dual vectors defining each geometrical point in the moving object relative to the ECI frame. Because the eigenvalues of the diagonalized rotational inertia tensor I are invariant, the time variant matrices [E P] and [P E]=[E P]$^T$ may define the geometrical rotation about principal axis frame P relative to the ECI frame as a rotational orientation matrix and its derivative (step 602).

The above described rotational orientation matrix and its derivative may then be represented as a parametric rotational state by obtaining three Euler angles and three Euler rates, based on the known conservation of rotational energy (e) and angular momentum (L) (step 604).

Finally, the rotational motion state may be represented by obtaining the geometrical coordinates of motion of the moving object (step 606). In the event that the moving object is undergoing spin-precession, a particular motion of interest, the moving object may be roll-symmetric such that the second two eigenvalues of the diagonalized rotational inertia tensor I are equal. The full geometric representation of the rotational state may then be defined by the ratio of the two distinct principal moments of inertia of the object, a constant cone angle, a constant angular velocity, and an origin of time at which the object passes through a particular phase of its motion. Of course, geometrical coordinates of motion may be developed for the more general case of non-symmetrical rotational motion, even though the solution thereof may require additional known initial conditions and a larger iterative search space.

Thus, rotational propagator 600 illustrated in FIG. 6 may propagate the rotational orientation and motion states of the moving object at a given time to solve for the rotational state at any desired past or future time (step 608). For example, rotational propagator 600 may be configured to determine the principal axes, constant cone angle, constant angular velocity, and origin of time for a moving object at any pulse time τ for a given set of estimated initial generalized coordinates of rotational motion (e.g., [E B]($\bar{p}$|t)). Such generalized models for both orbital-translational and rotational motion may facilitate the simultaneous solution for both the complete motion state and three-dimensional representation of an object moving in torque-free motion as described with respect to the exemplary space-time imaging system 100 and exemplary space-time imaging method 200 disclosed herein.

VII. INDUSTRIAL APPLICABILITY

The systems and methods for space-time imaging disclosed herein may be particularly advantageous in the generation of high-resolution, three-dimensional holographic images of objects moving in torque-free motion through outer space.

Specifically, by modeling the phase histories of a moving object based on solutions of Euler's equations, and other generalized coordinates of motion, instead of assuming linearity, more precise parameters may be obtained for the complete translational and rotational motion states of the object. Because the coherent integration time is only limited by the phase coherence of the radar hardware, it may be extended over the entire rotation period of the moving object, or even over multiple periods. Moreover, the space-time radar imaging systems and methods described herein may require greatly reduced radar resources as compared to traditional 3-D snapshot imaging methods.

Once the complete motion state of the object in ECI coordinates has been obtained, it may be possible for one or more of the radars to reconstruct wideband and narrowband static patterns of the object by associating pulse times with target aspects. These static patterns may be compiled at all frequencies by one or more of the radars viewing the object during the exoatmospheric stage of the object's flight. Because the image may be based on reconstructed static patterns, "smearing" may be eliminated and greater discrimination features of the moving object may be revealed than were previously available. For example, a three-dimensional, holographic image having an improved resolution on the order of 1 cm (i.e., roughly ⅓ wavelength) may now be generated.

Thus, the combination of high-resolution image representation and complete motion state may facilitate discrimination between various objects of interest, such as between various types of satellites orbiting the Earth, and between tumbling re-entry vehicles and spin-precessing re-entry vehicles. It may also allow discrimination between simple and sophisticated re-entry vehicle decoys by their motion and radar signature.

Finally, the complete motion solution may be obtained by a single radar system and then used by another radar to reconstruct the static patterns based on the obtained motion solution. Moreover, the complete motion solution may allow imaging of static patterns from pulse radar data in S-band radar systems, in addition to the traditionally used X-band radar systems. Therefore, the complete motion solution may be used in the fusion of radar signature information from dual frequency (S- and X-band) systems.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A system for imaging an object moving in torque-free motion, the system comprising:
   a receiver configured to acquire radar data reflected by an object moving in torque-free motion;
   a memory configured to store instructions for processing the acquired radar data; and
   a processor configured to determine a motion state of the moving object and generate a three-dimensional representation of the moving object, based on the determined motion state.

2. The system of claim 1, wherein the processor is configured to determine a motion state of the moving object by solving for complete solutions of the translational and rotational motion states of the moving object.

3. The system of claim 2, wherein the rotational motion state is based on solutions of Euler's torque-free equations of motions.

4. The system of claim 1, wherein the processor is configured to generate the three-dimensional representation of the moving object by associating radar pulse times with orientation estimates of the moving object.

5. The system of claim 1, further comprising a display unit that is configured to display the three-dimensional representation and the determined motion state simultaneously.

6. A computer-implemented method of imaging an object moving in torque-free motion, the method comprising the steps of:
   acquiring radar data reflected by the moving object;
   defining an intensity of the radar data as a function of generalized coordinates of motion;
   defining estimated initial conditions for the generalized coordinates of motion;
   integrating the intensity of the defined radar data across at least a portion of the moving object;
   redefining the estimated initial conditions until the integrated intensity of the radar data has been optimized; and
   generating a three-dimensional representation of the moving object by reconstructing static patterns of the moving object as a function of the estimated initial conditions that optimize the integrated intensity of the radar data.

7. The method of claim 6, wherein the static patterns are reconstructed by propagating the estimated initial conditions across radar pulse times based on at least one model of the generalized coordinates of motion.

8. The method of claim 6, the method further comprising the step of:

displaying a three-dimensional representation of the moving object based on the estimated initial conditions that optimize the integrated intensity of the radar data.

9. The method of claim 6, wherein the generalized coordinates of motion include models of the moving object that include at least one of:
   inertia tensor components;
   Euler angles;
   Euler rates;
   spin precession rates; and
   cone angle.

10. A computer-implemented method of imaging an object moving in torque-free motion, the method comprising:
   acquiring radar data reflected by the moving object;
   determining a complete motion state of the moving object; and
   generating a three-dimensional representation of the moving object based on the determined complete motion state, by associating radar pulse times with orientation estimates of the moving object.

11. The method of claim 10, wherein the complete motion state of the moving object is determined by solving for the translational and rotational motion states of the moving object.

12. The method of claim 11, wherein the rotational motion state is based on at least one of: a model of the inertia tensor components of the moving object, and solutions of Euler's torque-free equations of motions.

13. The method of claim 11, wherein the translational and rotational motion states include six invariant parameters of rotational motion and six invariant parameters of orbital motion.

14. The method of claim 10, wherein the step of determining includes:
   estimating initial translational and rotational conditions for the moving object;
   reconstructing static patterns of the moving object based on the estimated initial translational and rotational conditions; and
   defining an energy functional of the moving object as a function of the reconstructed static patterns;
   wherein the estimated initial translational and rotational conditions are iterated until the energy functional has been maximized.

15. The method of claim 14 wherein the estimated initial conditions include generalized models of the moving object that include at least one of:
   inertia tensor components;
   Euler angles;
   Euler rates;
   spin precession rates; and
   cone angle.

16. The method of claim 14, wherein three-dimensional representation of the moving object is generated by reconstructing static patterns of the moving object as a function of the estimated initial conditions that maximize the energy functional.

17. The method of claim 14, wherein the three-dimensional representation of the moving object is generated by associating radar pulse times with the reconstructed static patterns.

18. The method of claim 14, the method further comprising the step of:
   displaying the three-dimensional representation that expresses the estimated initial conditions corresponding to the maximized energy functional.

19. A computer-readable medium that stores a set of executable instructions, which when read by a processor perform steps in a method of imaging an object moving in torque-free motion, the steps comprising:
   acquiring radar data reflected by the moving object;
   determining a motion state of the moving object; and
   generating a three-dimensional representation of the moving object based on the determined motion state.

20. The computer-readable medium of claim 19, wherein the motion state of the moving object is determined by solving for complete solutions of the translational and rotational motion states of the moving object.

21. The computer-readable medium of claim 20, wherein the rotational motion state is based on a model of the inertia tensor components of the moving object.

22. The computer-readable medium of claim 20, wherein the rotational motion state is based on solutions of Euler's torque-free equations of motions.

23. The computer-readable medium of claim 19, wherein the three-dimensional representation of the moving object is generated by associating radar pulse times with orientation estimates of the moving object.

24. The computer-readable medium of claim 19, wherein:
   the step of determining includes:
      defining an intensity of the radar data as a function of generalized coordinates of motion;
      defining estimated initial conditions for the generalized coordinates of motion;
      integrating the intensity of the defined radar data across at least a portion of the moving object; and
      redefining the estimated initial conditions until the integrated intensity of the radar data has been optimized.

25. A computer-implemented method of imaging an object moving in torque-free motion, the method comprising the steps of:
   acquiring radar data reflected by the moving object;
   defining a metric of the radar data as a function of generalized coordinates of motion;
   defining estimated initial conditions for the generalized coordinates of motion;
   integrating the metric of the radar data across at least a portion of the moving object;
   redefining the estimated initial conditions until the integrated metric of the radar data has been optimized; and
   generating a three-dimensional representation of the moving object by reconstructing static patterns of the moving object as a function of the estimated initial conditions that optimize the integrated metric of the radar data.

26. A system for imaging an object moving in torque-free motion, the system comprising:
   a receiver configured to acquire radar data reflected by the moving object;
   a memory configured to store instructions for processing the acquired radar data; and
   a processor configured to determine a motion state of the moving object and generate a three-dimensional representation of the moving object, based on the determined motion state;
   wherein the motion state is determined based on a model of the inertia tensor components of the moving object.

* * * * *